United States Patent
Packer et al.

(10) Patent No.: US 10,198,483 B2
(45) Date of Patent: Feb. 5, 2019

(54) CLASSIFICATION ENGINE FOR IDENTIFYING BUSINESS HOURS

(71) Applicant: Opower, Inc., Arlington, VA (US)

(72) Inventors: Benjamin Packer, Palo Alto, CA (US); Erik Shilts, San Francisco, CA (US); Madhanmohan Raju, San Francisco, CA (US); Natalie Musick, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 802 days.

(21) Appl. No.: 14/699,324

(22) Filed: Apr. 29, 2015

(65) Prior Publication Data

US 2016/0224634 A1 Aug. 4, 2016

Related U.S. Application Data

(60) Provisional application No. 62/111,043, filed on Feb. 2, 2015.

(51) Int. Cl.
*G06F 17/30* (2006.01)
*G06Q 10/00* (2012.01)

(52) U.S. Cl.
CPC ....... *G06F 17/30551* (2013.01); *G06Q 10/00* (2013.01)

(58) Field of Classification Search
CPC ......... G06F 17/30551; G06F 17/30601; G06F 17/30705; G06F 17/30707; G06F 17/3071; G06F 17/30713; G06Q 10/00

(Continued)

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Hares Jami

(74) *Attorney, Agent, or Firm* — Kraguljac Law Group, LLC

(57) ABSTRACT

Aspects of the subject technology relate to methods and systems for classifying businesses according to an open-hours classification category, for example, based on resource consumption data. In some implementations, methods of the subject technology include steps for receiving a plurality of operating hours categories, wherein each of the operating hours categories is associated with at least one usage profile, and receiving business information for an unclassified business, wherein the business information comprises resource consumption data for the unclassified business. In some aspects, methods of the subject technology can further include steps for determining if the unclassified business should be associated with one of the operating hours categories based on the resource consumption data for the unclassified business. Systems and machine-readable media are also provided.

17 Claims, 6 Drawing Sheets

(58) Field of Classification Search
USPC .................................. 707/705, 737, 740
See application file for complete search history.

(56) References Cited

U.S. PATENT DOCUMENTS

| | | |
|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino Yutaka |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |

(56) References Cited

U.S. PATENT DOCUMENTS

| | | |
|---|---|---|
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078404 A1* | 3/2012 | Saito .............. G05B 19/4184 700/97 |
| 2012/0078417 A1 | 3/2012 | Connell, II et al. |
| 2012/0084063 A1 | 4/2012 | Drees et al. |
| 2012/0179692 A1 | 7/2012 | Hsiao et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0097177 A1 | 4/2013 | Fan et al. |
| 2013/0097481 A1 | 4/2013 | Kotler et al. |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0088442 A1* | 3/2015 | Farrar ................ G01R 21/1333 702/62 |
| 2015/0170156 A1* | 6/2015 | Wuest .................. G06Q 30/018 705/317 |
| 2015/0227522 A1 | 8/2015 | O'Donnell et al. |
| 2015/0227846 A1 | 8/2015 | Mercer et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0300831 A1 | 10/2015 | Sernicola |
| 2015/0310019 A1 | 10/2015 | Royer et al. |
| 2015/0310463 A1 | 10/2015 | Turfboer et al. |
| 2015/0310465 A1 | 10/2015 | Chan et al. |
| 2015/0319119 A1 | 11/2015 | Ryu et al. |
| 2015/0324819 A1 | 11/2015 | Lin et al. |
| 2015/0326679 A1 | 11/2015 | Lin et al. |
| 2015/0363642 A1* | 12/2015 | Irie ...................... G06K 9/6263 382/103 |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May, 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.

Chen, Hanfeng, et al., "Testing for a Finite Mixture Model With Two Components," Journal of the Royal Statistical Society, Series B, vol. 66, No. 1, 26 pages, 2004.

(56) References Cited

OTHER PUBLICATIONS

De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "Prism: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date 4/1812015, available at http://notamystery.com/2015/04/18/not_worth_the_papeUts_printed_on>.
Goldberg, Miriam L., et al., "Refraction of Prism Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.
Laskey, Alex, et al., "Opower," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f.. uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
SA1NKA, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

* cited by examiner

CLASSIFICATION ENGINE FOR IDENTIFYING BUSINESS HOURS

CROSS-REFERENCE TO RELATED APPLICATIONS

This application claims the benefit of priority to U.S. Provisional Application Ser. No. 62/111,043, filed Feb. 2, 2015, entitled "IDENTIFYING BUSINESS HOURS BASED ON RESOURCE USAGE," which is hereby incorporated by reference in its entirety.

BACKGROUND

Technical Field

Aspects of this disclosure relate to methods and systems for predicting hours of operation or "business hours" for various establishment types, and in particular, for determining operating hours information based on various types of business information, such as resource usage information.

Introduction

Many types of service providers and vendors could benefit from knowing operating hours for individual businesses. For example, accurate open hours information could help utility providers make customer-specific recommendations for participation in eco-conscious conservation programs, such as energy efficiency programs.

SUMMARY

The following presents a simplified summary of one or more embodiments in order to provide a basic understanding of such embodiments. This summary is not an extensive overview of all contemplated embodiments, and is therefore not intended to identify key or critical elements of all embodiments nor delineate the scope of any or all aspects of the invention. Its sole purpose is to present some concepts of one or more embodiments in a simplified form as a prelude to a more detailed description, presented later.

Aspects of the technology relate to a computer-implemented method including steps for receiving a plurality of operating hours categories, wherein each of the operating hours categories is associated with at least one usage profile, and receiving business information for an unclassified business, wherein the business information comprises resource consumption data for the unclassified business. In certain aspects, methods of the technology can further include steps for determining if the unclassified business should be associated with one (or more) of the operating hours categories.

In another aspect, the subject technology relates to a classification system (e.g., an operating hours category classification system), including one or more processors, and a computer-readable medium having instructions stored therein, that when executed by the processors, cause the processors to perform various operations including, receiving a plurality of operating hours categories, wherein each of the operating hours categories is associated with at least one usage profile, and receiving business information for an unclassified business. In some aspects, the classification system can further execute operations for determining if the unclassified business should be associated with one of the operating hours categories from among the plurality of operating hours categories.

In yet another aspect, the subject technology can relate to a non-transitory computer-readable storage medium that includes instructions for receiving a plurality of operating hours categories, wherein each of the operating hours categories is associated with at least one usage profile, and receiving business information for an unclassified business, wherein the business information comprises resource consumption data for the unclassified business. In some approaches, the instructions can further include steps for determining if the unclassified business should be associated with one of the operating hours categories by comparing the business information to one or more of the usage profiles.

BRIEF DESCRIPTION OF THE DRAWINGS

In the following description, reference is made to the following figures, and in which are shown by way of illustration specific examples in which the subject technology may be practiced. It is understood that other aspects may be utilized and changes made without departing from the scope of the subject technology. In the figures.

DETAILED DESCRIPTION

Figure 1:
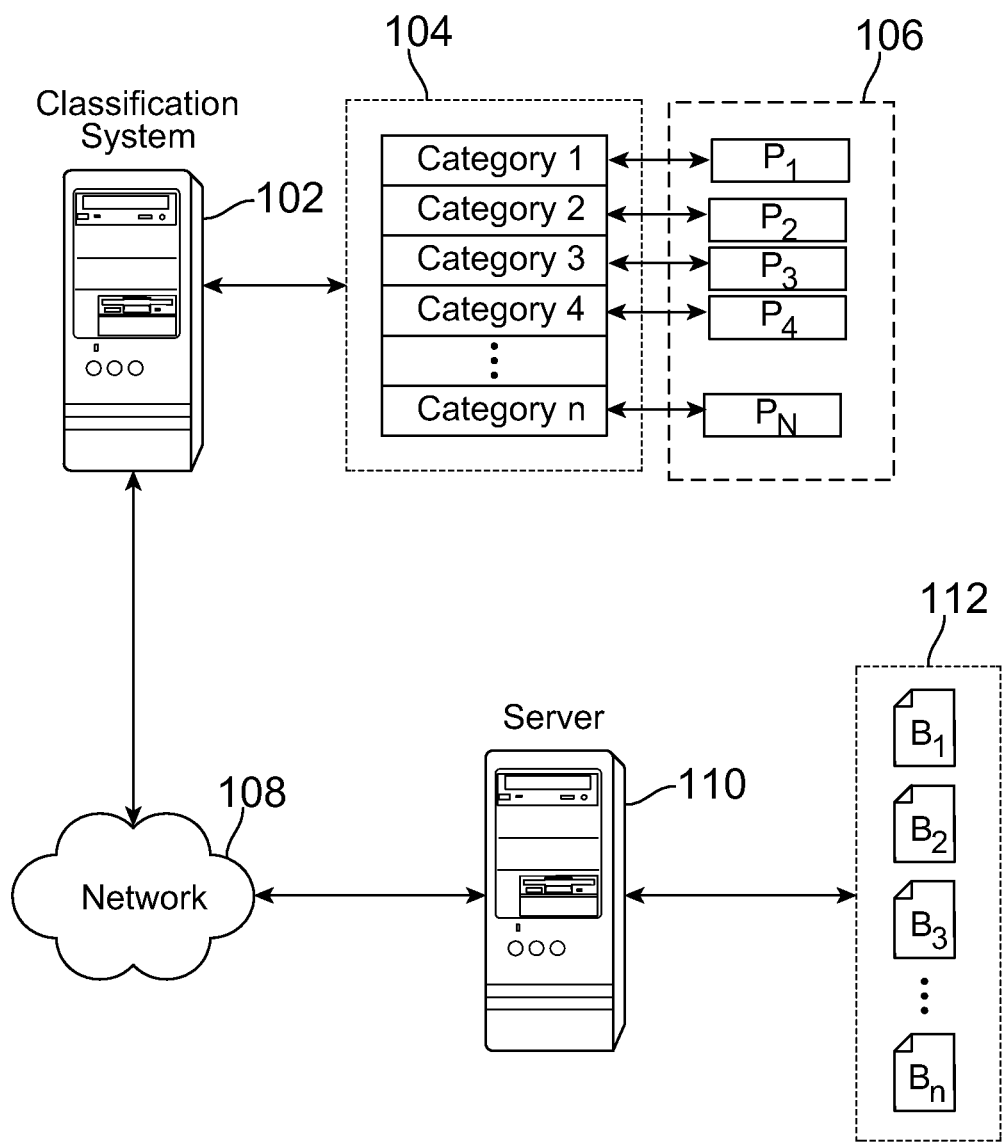
FIG. 1 illustrates an example environment that can be used to implement a business hours classification system, according to some aspects of the technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the subject technology address the foregoing need by providing methods and systems for determining operating hours for business establishments of various types. In some aspects, resource consumption data, such as power (e.g., electricity) consumption data, can be used to classify businesses using a classification category identifier, e.g., an "operating-hours category" identifier. In some aspects, power consumption data can be provided in the form of power load curve data, which provides a graphical representation of resource consumption relative to a given time resolution (e.g., on monthly, weekly, daily or minute-by-minute intervals etc.). The power consumption data may be analyzed in order to identify one or more elevated energy usage periods that may correspond to operating hours of a business establishment. Alternatively, or additionally, the power consumption data may be analyzed in order to identify one or more periods of low energy usage that may correspond to non-operating hours of a business establishment.

In many circumstances, information about the hours a business is open (e.g., the operating hours of a business) is nonexistent or unreliable. Aspects of the subject technology address these technical problems by providing a classification engine that is able to interface with various systems to collect consumption data for a business establishment and store the data in a database or other storage device. The classification engine may process the consumption data, which may correspond to a prolonged period of time (e.g., 1 to 6 months of consumption/usage data, the consumption data comprising usage data of various possible resolutions or intervals), in order to generate power load curve data for the business establishment. Based on the consumption data (or power load curve data), the classification engine may accurately determine the operating hours for the business establishment and store the operating hours in a business profile or communicate the information to another system.

Although many of the provided examples relate to open hours classifications based on electric energy consumption, it is understood that other information may be used without departing from the scope of the invention. For example, various forms of demographic data can be used (e.g., in conjunction with resource consumption information) to determine business operating hours for a given business. Examples of such demographic data include, but are not limited to, one or more of: business name, location information, square footage, business type, and/or advertising information (e.g., menu data, products listings), etc.

Categories of operating hours may be used to identify operating hours of a business establishment. For example, in some aspects, different operating hours categories are generated, each of which corresponds to a particular hourly schedule that identifies operating hours for an associated businesses. In turn, each operating hours category is associated with one or more usage profiles, each of which contain information (e.g., data and consumption pattern information) that can be used to identify operating hours for an unclassified business.

By way of example, business information containing resource consumption data can be compared with various usage profiles to determine if any patterns/similarities with existing usage profiles can be identified. If a positive match is found, the corresponding operating hours category is associated with the unclassified business, e.g., to associate operating hours information to the previously unclassified business. As used herein, an "operating hours category" relates to a classification category used to define a business schedule e.g., for the business's operating hours or alternatively, a schedule for the business's closed hours. Operating hours categories can contain various types of time interval data, such as open days (e.g., Monday through Friday), open times of day (e.g., "nighttime" or "daytime") and/or specific operating-hours intervals (e.g., Open Monday: 10:00 AM to 3:00 PM and 5:00 PM to 10:00 PM; Closed Tuesday).

Depending on implementation, comparisons between business information and usage profiles can be performed in different ways. For example, machine learning implementations (such as clustering) can be used to compare unclassified business information with usage profiles produced using training data (i.e., data sets for which known operating hours are already know). As discussed in further detail below, comparisons between business information and usage profiles can also be based on quantified comparisons, and/or user define patterns and/or qualitative features.

Through use of the classification engine, previously unclassified businesses (for which open/closed hours information was previously unknown), can be associated with open hours information. Such information can be of use in several practical applications. In some aspects, open hours information can be used by a behavioral demand response (BDR) notification system or service, for example, to help segment or group businesses with similar hourly schedules. In some implementations, open hours classifications may be used to help in identifying similar businesses, such as those providing similar goods/services and that have similar operating hours. However, in other implementations, open hours classifications may be used to identify/match different businesses or consuming entities on the basis of consumption patterns, for example, based on similarities in operating hours. In this way, the relevance of targeted notifications, such as BDR notifications, can be enhanced, e.g., by improving comparisons between similar business customers that are delivered as part of the notification content.

In other aspects, open hours information may be provided to a resource provider or other third party, such as a power utility, for example, to help improve the utility service's interactions with its customers. By way of example, a power utility may be interested in better understanding operating schedules of its business customers in order to improve marketing or advertising communications, for example, pertaining to customer enrollment in energy savings programs.

FIG. 1 illustrates an example environment 100 that can be used to implement an operating hours classification system (and method), according to some aspects of the technology. Environment 100 includes classification system 102 that is configured to classify businesses into one or more operating hours categories e.g., to associate operating hours with businesses for which operating hours were previously unknown or unverified.

In the example of environment 100, classification system 102 includes category database 104 that contains multiple operating hours categories (i.e., Category 1 ... Category N). Operating hours categories can be user created/generated, for example, based on a user's selection of associated scheduling information. Alternatively, operating hours categories may be automatically or machine generated, for example, based on a grouping of one or more corresponding usage profiles, as discussed in further detail below.

As illustrated by category database 104, each operating hours category is associated with one or more usage profiles $P_1 \ldots P_n$ (e.g., in usage profile database 106). Usage profiles can contain information used for comparison with business information, for example, to help determine corresponding operating hours scheduling information for an associated business. That is, usage profiles can contain identifying/comparison information used to analyze business information corresponding with an unclassified business, as explained in further detail below. Depending on implementation, usage information can include various types of data, such as energy usage data (e.g., a power load curve), for example, that can correlate with an operating hours schedule for the associated operating hours category. Similar to the operating hours categories, in some aspects, usage profiles may be user generated (e.g., through the selection of certain data features by a user or administrator). Alternatively, usage profiles may be machine generated, e.g., based on clusters of consumption data and/or frequency information for other types of information such as textual information (e.g. business names and/or titles, etc.).

In some aspects, each usage profile is exclusive to a single operating hours category. That is, each operating hours category defines a unique schedule or set of schedules for which associated businesses are open to serve customers, whereas the associated usage profile includes data used to identify businesses (using business information), that have operating hours corresponding with the operating category. In the example of FIG. 1, each of the usage profiles (e.g., $P_1 \ldots P_n$) are stored in usage profile database 106. However, it is understood that associations between a particular category (e.g., Category 1), and one or more usage profiles (e.g., $P_1$ and $P_2$) can be accomplished using various other data structures and/or methods, such as pointers, linked lists, arrays and/or function calls, etc.

In example environment 100, classification system 102 is coupled to server 110, e.g., via network 108. Network 108 can represent a variety of communication networks, including a combination of private networks, such as local area networks (LANs), wide-area networks (WANs), WiFi networks, cellular networks or a network of networks, such as the Internet. As discussed in further detail below, network 108 can communicate with other types of data providers, such as utility providers and/or configured for communication with smart devices such as Advanced Metering Infrastructure (AMI) devices, or smart thermostats, etc.

Server 110 includes business information database 112 that is configured to store business information for one or more unclassified businesses (e.g., businesses for which open hours information is unknown or unverified). In the illustrated example, database 112 includes business information for multiple unclassified businesses (e.g., $B_1$, $B_2$, $B_3 \ldots B_n$). It is understood that business information for any number of unclassified businesses may be accessible by server 110 and stored either locally or remotely. It is further understood that server 110 represents potentially any source of business information. As such, server 110 can include one or more third-party systems or proprietary data stores capable of providing business information to classification system 102 via a network, such as network 108. By way of example, server 110 can represent a data collection network that retrieves information from various online sources, such as business directories, review websites, map providers, and/or rebate websites, etc.

In practice, business information is provided to classification system 102, for example, by server 110. Business information can be collected or aggregated from one or more sources, such as a resource provider (e.g., a power utility) or from one or more third-party services capable of providing demographic data. Business information can be provided directly to classification system 102, or alternatively, to an intermediary processing system, such as that represented by server 110.

In some aspects, business information for each unclassified business entity is segregated into discreet data packages or files (e.g., $B_1$, $B_2$, $B_3 \ldots B_n$) and/or separated using metadata tags. As discussed above, business information can contain any information or data pertaining to a particular business, such as resource consumption information (e.g. load curve data), or other demographic information, such as, business name, location, advertising information, etc.

Once the business information for an unclassified business is provided to classification system 102, classification system 102 can use open hours categories and their corresponding usage profiles (e.g., usage profiles $P_1 \ldots P_n$) to determine if an open hours category assignment should be made for the unclassified business. In some approaches, a similarity between the received business information and one or more usage profiles is determined by comparing the business information to the usage profiles.

Where a high-degree of business information/usage profile similarity is identified, an association is created between the corresponding open hours category and the unclassified business. That is, open hours scheduling information attaches to the previously unclassified business. Such associations can be accomplished by editing and/or appending the business information to include a metadata reference to a particular open hours category.

By way of example, business information $B_1$ for an unclassified first business may be determined to be highly similar to profile information of usage profile $P_1$ (associated with Category 1). As discussed above, $B_1$ can include resource consumption data (e.g., for one or more consumable resources such as power, water and/or gas). Further to the above example, category profile $P_1$ may be based on a cluster of resource consumption information that correlates with business operating hours (e.g., between the hours of 6:00 AM and 8:00 PM). Thus, based on similarities between $B_1$ and $P_1$, the business corresponding with $B_1$ is associated with Category 1, which identifies $B_1$ as having operating hours from 6:00 AM to 8:00 PM.

In the foregoing example, any type of information can be used to form, or included in, a usage profile with which the business information is compared. For example, $P_1$ can contain resource usage data (e.g., power data) collected by a utility provider. Data collection frequency may depend on the collection mechanism, for example, utility providers may ascertain consumption data using on-site meter readers, for example, on a monthly basis, or alternatively on more frequent time intervals (e.g., on a daily, hourly or minute-by-minute basis), using an advanced metering infrastructure (AMI) device. Thus, by comparing the available business information for business $B_1$ with information stored in the various usage profiles for operating hours categories 1-N, operating hours category assignments can be made for the previously unclassified business associated with $B_1$.

Figure 2:
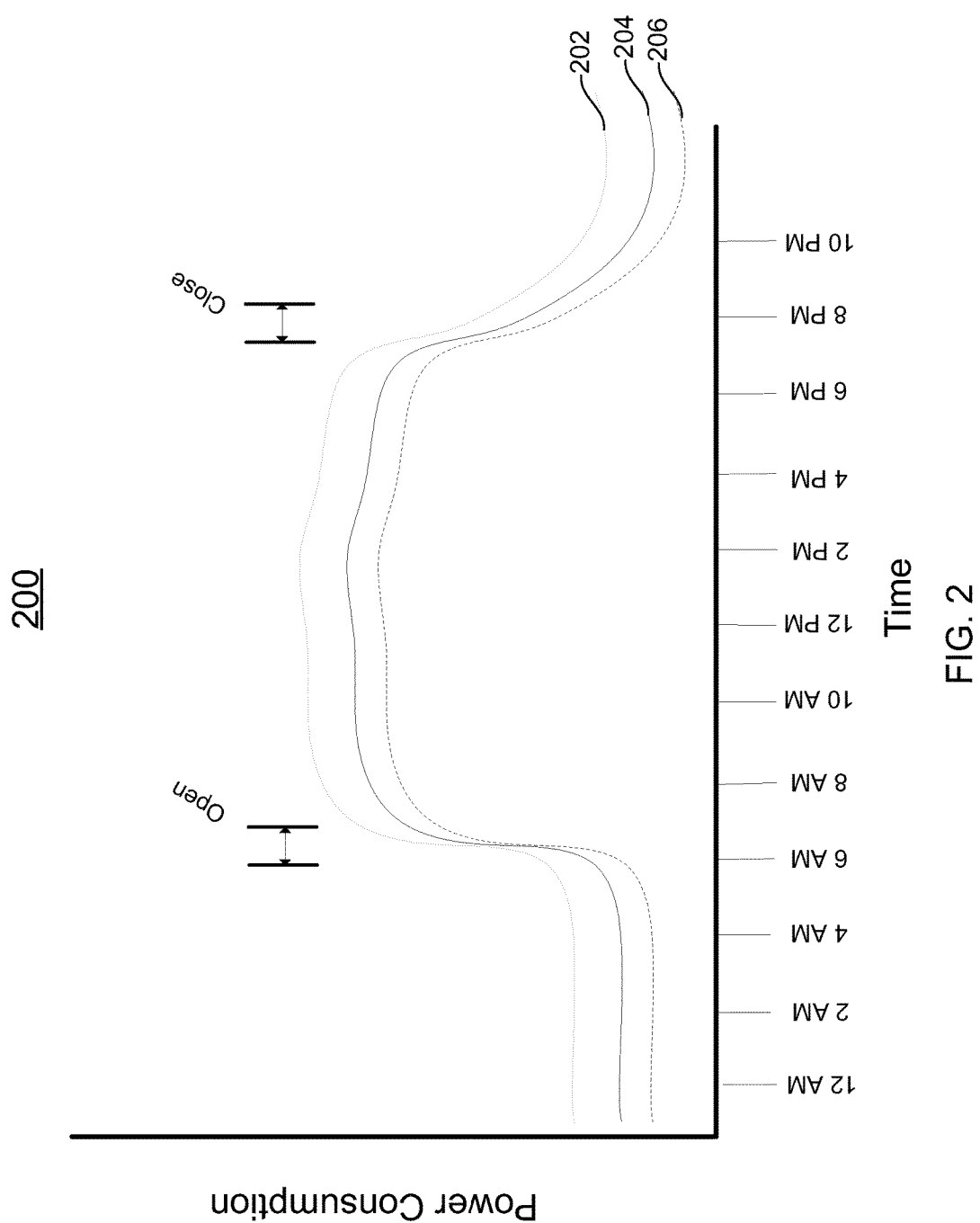
FIG. 2 conceptually illustrates an example of power load curves for various businesses, according to some implementations.

FIG. 2 conceptually illustrates an example of load curve data 200 for various businesses (e.g., businesses 202, 204 and 206), according to some implementations. Load curve data 200 is illustrated using power load curves for three different business establishments having similar operating schedules. As used herein, "power load curve" refers to graphical or illustrative embodiments of time-varying measures of resource consumption, such as measures of power consumption on specific time intervals, e.g., monthly, weekly, daily or hourly, etc. Although example load curve data 200 relates to electric power usage, the example of FIG. 2 is illustrative and not exclusive of representations of consumption patterns for other resources, such as water or gas.

In practice, resource consumption information (such as load curves for businesses 202, 204, and/or 206) may be aggregated for businesses for which operating hours are already known, or verified. As shown in FIG. 2, "open" and "close" intervals for businesses are identified, for example, based on known operating hours information and/or power consumption features identified in the load curve geometry. In some aspects, this information can be used to create a usage profile against which subsequent unclassified businesses can be compared. That is, business information may be compared to usage profiles containing data such as that represented by load curves for businesses 202, 204, and/or 206.

In some aspects, a given usage profile may only identify an open/closed hours schedule for a particular time (e.g., mornings), days of a week (e.g., Wednesdays), or even a particular date, such as a government or cultural holiday (e.g., July 4$^{th}$). Alternatively, usage profile information can be used to match or identify business operating hours across multiple days, times and specific dates. Thus, a schedule corresponding with a particular operating hours category can be a composite of all the usage profiles associated with that category.

By way of example, a given operating hours category can be associated with two usage profiles, P1 and P2. In this example, P1 provides data for identifying business operations on Monday mornings and P2 provides data for identifying business operations on Wednesdays. As such, the operating hours category would be associated with scheduling information for Mondays and Wednesdays. Thus, the association between operating hours categories and usage profiles can be used to determine the operating schedule defined by the operating hours categories.

Further to the above example, newly received business information (e.g., for an unclassified business for which operating hour are unknown or unverified) is compared to usage profile information generated from load curves for businesses 202, 204 and/or 206. As discussed in further detail below, where a high degree of similarity is identified as between business information for a particular business and a given usage profile, associations may be formed between an associated operating hours category (e.g., corresponding with the usage profile) and the business information.

Figure 3A:
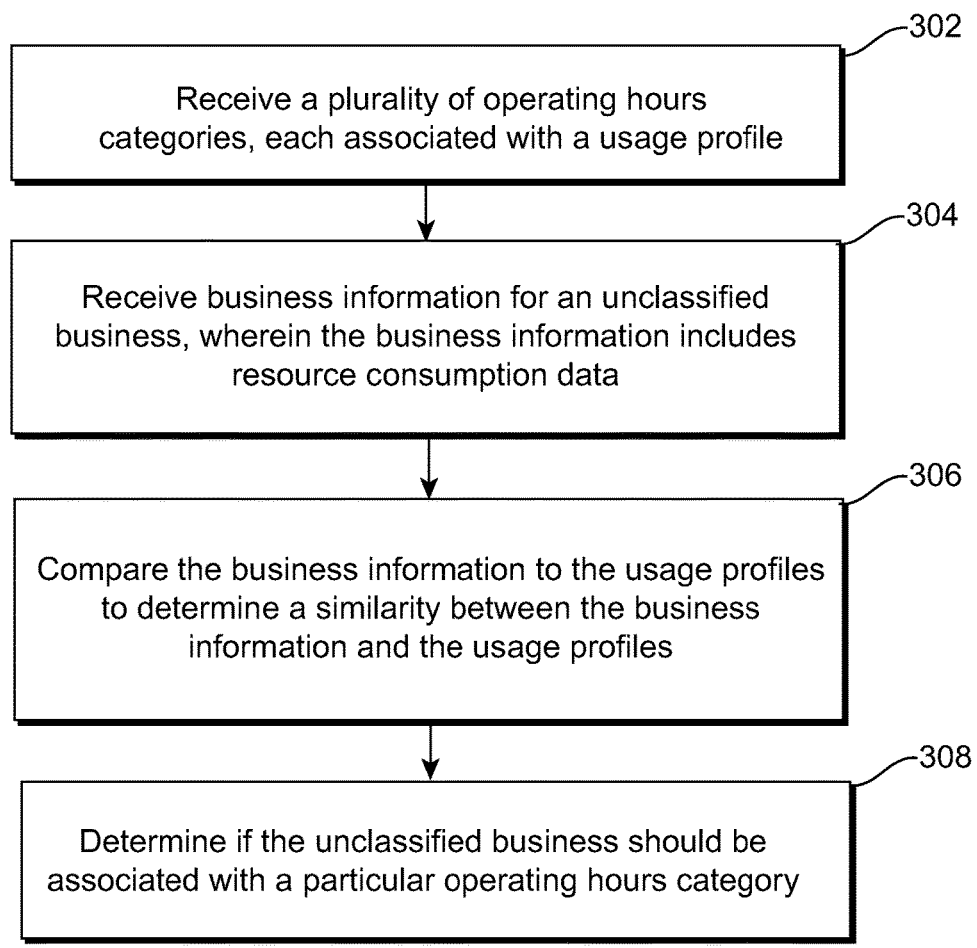
FIG. 3A illustrates an example process that can be used to perform operating hours classifications, according to some aspects of the technology.

FIG. 3 illustrates an example process 300 that can be implemented to perform operating hours classifications. Process 300 begins with step 302, in which a plurality of operating categories are received and/or created or generated. The generation of operating hours categories can be accomplished with a processor based system, such as a classification system (e.g., classification system 102). In some aspects, operating hours categories are user created, for example, based on a user defined hourly schedule. As discussed above, the association between operating hours categories and usage profiles can be performed according to the schedule defined by the operating hours category. For example, if the operating hours category is used to describe an operating hours schedule for weekdays (e.g., Monday-Friday), then usage profiles containing comparative consumption data for weekdays may be associated with the operating hours category. In some aspects, operating hours categories may be generated and/or initialized on one or more third-party systems and then transmitted to the classification system. When implemented, the various operating hours categories are used to define different operating hours schedules, for example, on a daily, weekly, or monthly basis. Operating hours categories may also be used to identify open hours schedules on special days, such as cultural or governmental holidays.

As discussed above, usage profiles provide data that can be used to analyze business information for unclassified businesses and to make operating hours category classifications. That is, usage profiles provide data "fingerprints" to identify key features or patters in business information, such as resource consumption patterns that are necessary to infer when an associated business is open (generally associated with higher resource consumption), or closed (generally associated with lower resource consumption). Depending on implementation, each usage profile can identify different aspects of an operating hours schedule. For example, some usage profiles may be specific to a particular business type, such as a bakery. Alternatively, certain usage profiles may be specific to particular schedules, or schedules on specific calendar days, etc.

By way of example, a given usage profile (e.g., usage profile "P1"), may define a general open hours schedule for retail establishments on business days (e.g., Monday through Friday). In contrast, a different usage profile ("P2") may identify usage patterns for a specific business type (e.g., bakeries), on a specific day of the week (e.g., Saturdays). Thus, a multitude of usage profiles may be associated with a given operating hours category in order to yield detailed operating hours information for businesses associated with that category.

In practice, operating hours categories can comprise labels or tags, such as metadata tags, that can be attached to, or associated with a business. As noted above, a given operating hours category can be associated with one or more businesses, for example, to indicate similar hourly operating schedules for different distinct businesses.

In step 304, business information for an unclassified business is received. Although the business information for an unclassified business can contain data of different types (such as a business name, location and/or other demographic information), in some aspects, the business information includes resource consumption data for one or more consumable resources, such as electric power.

In practice, business information may be received from virtually any source, including but not limited to a utility provider, a smart device (such as a smart thermostat or behavioral demand response device), and/or a third-party provider or data collection service. By way of example, business information in the form of power consumption information may be received from a smart meter device, such as advanced metering infrastructure (AMI) device that is capable of communicating directly with a classification system, such as classification system 102, discussed with respect to FIG. 1, above.

In step 306, the business information is compared to one or more usage profiles to determine which, if any, of the usage profiles share a high-degree of similarity with the provided business information. Analysis of the business information (e.g., through comparison with the usage profiles) can be accomplished with machine-learning techniques, such as clustering. In some aspects, a quantitative measure of similarity between a set of business information (for an unclassified business) and a particular usage profile may be generated. By way of example, when comparing business information with a usage profile, a numeric score output, such as on a 1-10 scale, can be used to indicate a relative measure of similarity. In such approaches, a score of 1 may indicate little similarity between the business information and the usage profile, whereas a score of 10 can indicate a high degree of similarity.

By way of further example, business information provided for an unclassified business, such as a restaurant that specializes in breakfast and brunch may correspond with a business with operating hours according to the following schedule: Monday through Friday: 7:00 AM to 6:00 PM; Saturday: 8:00 AM to 4:00 PM; and Sunday: Closed. Thus, when compared to a first usage profile with a highly similar schedule (e.g., Monday through Friday: 7:00 AM to 6:00 PM; Saturday and Sunday: Closed), the comparative numeric score output may be an '8.' In contrast, if the same business information is compared to a second usage profile representing a dissimilar operating hours schedule (e.g., Wednesday through Sunday: 10:00 AM to 4:00 PM; Sunday through Monday 6:00 AM to 3:00 PM; and Sunday: Closed), the comparative numeric score output may be a '2.'

In step 308, a determination is made as to whether or not the unclassified business should be associated with a particular operating hours category. In some aspects, a threshold similarity score may be used. For example, similarity scores above a predetermined threshold similarity score may result in the formation of associations (classifications) with respect to business information for a previously unclassified business. Further to the above example, if the predetermined threshold similarity score is a '7,' then an association may be formed between the business and an open hours category corresponding with the first usage profile, whereas no associations would be formed with the second usage profile.

Figure 3B:
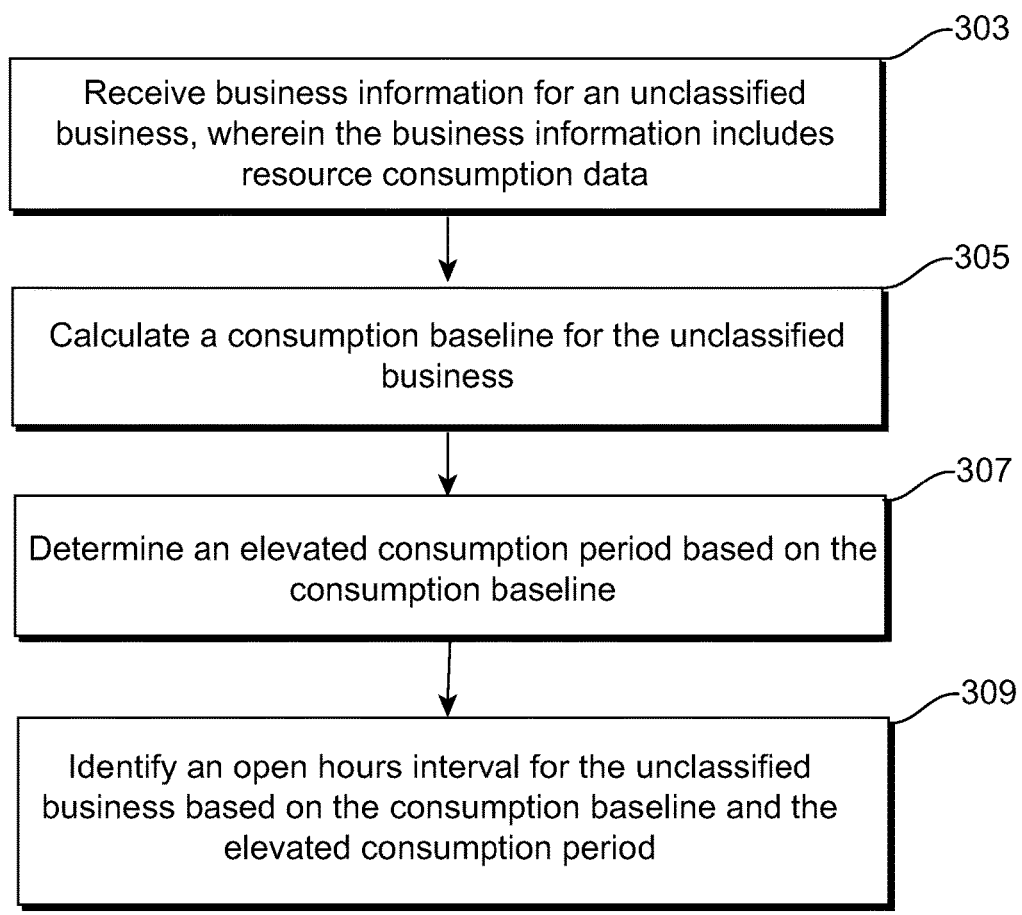
FIG. 3B illustrates another example process that can be used to determine an operating hours schedule for an unclassified business, according to some aspects of the technology.

FIG. 3B illustrates steps of another example process 301 that can be used to determine an operating hours schedule for an unclassified business. Process 301 begins with step 303 in which business information for an unclassified business is received e.g., by a classification system, such as classification system 102. As discussed above, the business information for the unclassified business can contain data of different types, such as name or title, location and/or other demographic information. In some aspects, the business information includes resource consumption data for one or more consumable resources, such as electric power. In some instances, the business information, including resource consumption data, may be formulated into a graphical representation of resource consumption, such as a power load curve.

In step 305, a consumption baseline for the unclassified business is calculated. For electric power consumption, the consumption baseline can be derived from power consumption data, such as power load curve data reflecting electric power use by the unclassified business. In such aspects, the consumption baseline can represent a minimum power consumption amount over a given unit of time, such as a time of day (e.g., nighttime or mornings) or a day of the week (e.g., Sundays), etc. The minimum power consumption may be a minimum average power consumption amount or a pattern of minimum power consumption that reflects (sometimes periodic) consumption that occurs during closed hours (e.g., periodic refrigeration cycles).

In step 307, an elevated consumption period is determined based on the consumption baseline. As used herein, the "elevated consumption period" can represent a period of time for which resource consumption is elevated above the consumption baseline calculated in step 305. Elevated consumption periods can be identified in various ways, depending on implementation. In some aspects, elevated periods can be identified by marked increases in a rate of resource consumption for a period of time (e.g., over a threshold 30% increase in power consumption over a two-hour timespan). Similarly, elevated consumption periods may include decreases in a rate of resource consumption (e.g., a 45% decrease in a one-hour timespan). It is understood that the rate change (either increase or decrease) necessary to define an elevated consumption period may vary, depending on the implementation.

In another aspect, elevated consumption periods may be determined/identified by based on a total change (e.g., increases or decreases) in resource consumption usage. By way of example, a threshold net resource consumption increase (e.g., 2 kW h) for the unclassified business may be used to determine that an elevated consumption period has begun. Similarly, a net decrease (e.g., again by 2 kW h) may indicate that the elevated consumption period has ended. Thus, the elevated consumption period can be determined by increases and/or decreases in resource usage.

In yet another aspect, elevated consumption periods may be identified based on an analysis of graphical resource consumption patterns, such as power load curves. By way of example, load curve slopes may be used to identify increases/decreases in consumption that may correlate with an opening/closing of the associated (unclassified) business. In some aspects, slopes exceeding a predetermined threshold can be determined to represent the beginning (or end) of an elevated consumption period.

In step 309, an open hours interval (e.g., the unclassified business's operating schedule) is identified based on the consumption baseline and the elevated consumption period. For some businesses, the consumption baseline corresponds with a minimum (sometimes non-zero) power consumption, for example, that is necessary for required operations performed outside of operating hours. Thus, the baseline periods can represent time intervals in which a business is closed. Examples of resource usage that can occur during closed hours include power consumption necessary to operate cooling appliances, such as refrigerators, or information technology (IT) infrastructure, such as servers and/or datacenters.

Conversely, the elevated consumption periods, marked by higher resource consumption, can correspond with greater resource consumption and expenditure associated with a business's operating hours. By way of further example, during operating hours, businesses such as restaurants may expend more power, for example, to power lights, elevators, and ovens, etc. that are required to provide customer service during hours of operation. Thus, by differentiating between baseline periods and elevated consumption periods, methods of the subject technology can identify open/closed hours intervals for an unclassified business.

In some aspects of the subject technology, transition periods (e.g., a transition period from open hours to closed hours or a transition period from closed hours to open hours) may also be considered. Transition periods may be reflected in the resource consumption data as an increase or decrease in resource consumption that represents the transitions between the consumption baseline and the elevated consumption period(s). In some cases, the transition periods may be smooth, such as when opening or closing a business involves merely increasing or decreasing consumption. In other cases, however, the transition periods may include spikes in consumption or other patterns of consumption not associated with the consumption baseline or elevated consumption periods. For example, some businesses perform various preparation tasks before opening that increase resource consumption even above the level of the elevated consumption period(s). In other cases, businesses may perform various closing tasks before or after closing that increase resource consumption. These transition periods may be included or excluded from the open hours interval or closed hours intervals.

With the ability to classify businesses based on operating hours (e.g., where operating hours information was previously unavailable or unknown or unverified), more accurate communication outreach to business customers may be possible. For example, in the context of behavioral demand response notification delivery wherein customer comparisons are employed, a greater degree of similarity between different businesses (e.g., on the basis of operating hours information) may be used to increase the content relevance of targeted notifications.

Figure 4:
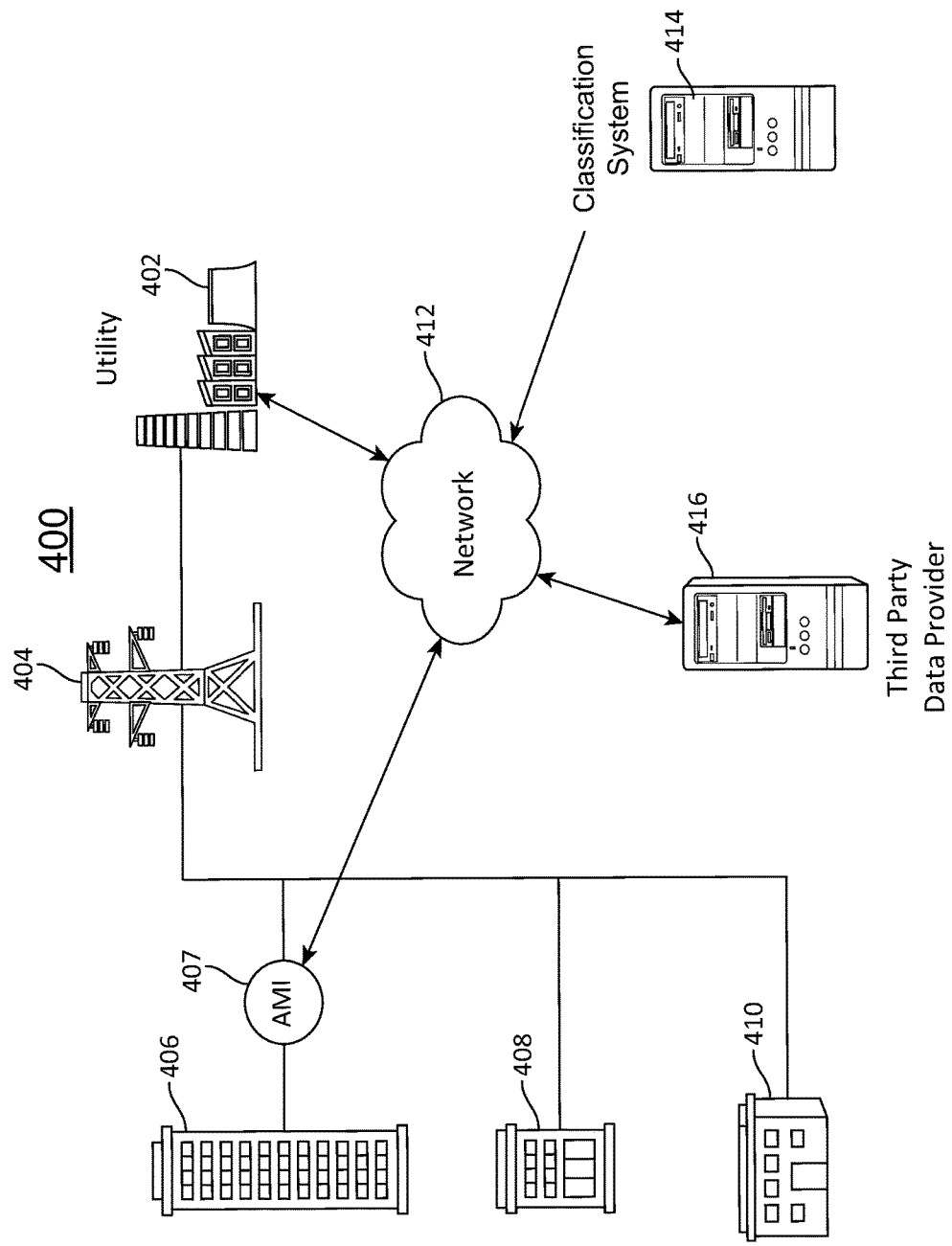
FIG. 4 illustrates an example environment in which business information can be collected and provided to a classification system.

FIG. 4 illustrates an example system 400 in which business information can be collected and provided to a classification system (e.g., classification system 414) according to some aspects of the technology. System 400 includes a utility 402 that is communicatively connected to several business entities (e.g., businesses 406, 408, and 410) via power infrastructure 404. System 400 also includes a classification system 414, and a third-party data provider communicatively coupled to one another, as well as utility 402, e.g., via network 412. Furthermore, network 412 is communicatively coupled to Advanced Metering Infrastructure (AMI) device 407. In the example of system 400, power infrastructure 404 includes various types of power delivery infrastructure. Similarly, network 412 can represent various communication networks, such as local area networks (LANs), wide area networks (WANs), or a network of networks, such as the Internet.

In practice, business information for each of businesses 406, 408 and 410 can be collected either directly by classification system 414, or via an intermediary collection step, such as by utility 402 or third party server 416. By way of example, utility 402 may collect/aggregate business information (such as power consumption data) pertaining to any (or all) of businesses 406, 406 and/or 410. Collected information can be based on monthly power readings performed at a site of the respective business. In some aspects, more frequent readings may be taken using an advanced metering infrastructure (AMI) device, such as AMI 407, e.g., to take power consumption readings on a daily, hourly or minute-by-minute basis.

In certain aspects, business information pertaining to any of businesses 406, 408 and/or 410 may also be collected by a third party agency or service, such as third party data provider 416. In this example, third party data provider 416 represents any service or combination of services (including on or more servers, clusters or data collection networks) that can collect, host and/or provide various types of information.

In practice, business information received by classification system 414 can include a mixture of resource usage and/or demographic information that is received either directly, or via one or more intermediary parties, such as utility 402 and/or third party data provider 416. By way of example, business information for business 406 may be received by classification system 414 via both of utility 402 and third party data provider 416 Once received by classification system 414, the business information can be used to determine one or more business operating hours classifications for the associated business, for example, to identify operating hours for the business based on an analysis of resource consumption over time.

It is understood that system 400 is exemplifies one example of an environment in which aspects of the invention can be practiced; however, other configurations can be implemented without departing from the scope of the subject technology. For example, in other implementations, various numbers of consuming entities (e.g., businesses, residences, or industrial facilities) may be represented. Similarly, various numbers or other types of resource providers (such as a water or gas provider may be represented).

Figure 5:
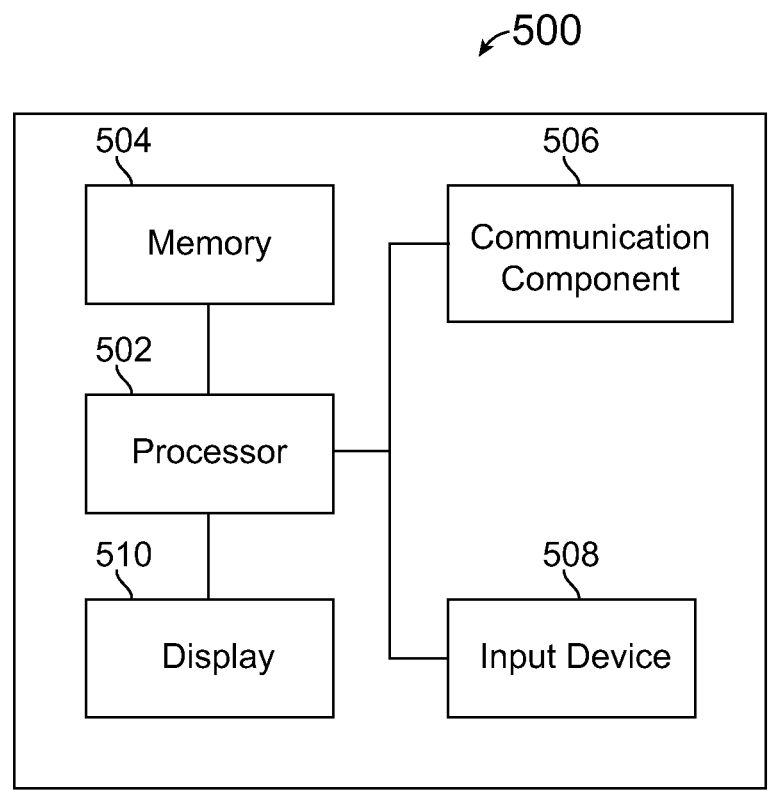
FIG. 5 illustrates a conceptual block diagram of hardware components used to implement a business classification system, according to some aspects of the technology.

FIG. 5 illustrates an example configuration of components of computing device 500, which may be used to implement a classification system, as discussed above with respect to FIGS. 1-3. In this example, computing device 500 includes processor 502 for executing instructions stored in memory device or element 504. The instructions can cause computing device 500 to execute a computer-implemented method, for example, to associate businesses with one or more operating hours categories that identify the businesses' operating hours.

As would be apparent to one of skill in the art, computing device 500 can include various types of memory, data storage, and/or non-transitory computer-readable storage media, such as a first data storage for program instructions for execution by the processor 502, a separate storage for usage history or user information, a removable memory for sharing information with other devices, etc. Computing device 500 can also include one or more communication components 506, such as a Wi-Fi, Bluetooth®, radio frequency, near-field communication, wired, and/or wireless communication systems, etc.

Computing device 500 can communicate with a network (e.g, network 412), such as the Internet, and can be configured to communicate with other such devices, such as one or more smart thermostat device, demand response devices, and/or AMI metering devices. Computing device 500 may include at least one input device 508 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some aspects, however, such a device may not include any buttons at all, but rather controlled through a combination of visual and audio commands, such that a user can manipulate data input to the device without direct physical contact. Computing device 500 can also include a display element 510, such as a touch-screen or liquid crystal display (LCD).

The various aspects can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method comprising:
receiving a plurality of operating hours categories, wherein a first operating hours category is associated with a first power usage profile describing a rate of change power characteristic, wherein a set of electronic messages are maintained in a storage device in association with the plurality of operating hours categories;
receiving business information for an unclassified business, wherein the business information comprises resource consumption data for the unclassified business, the resource consumption data describing a rate of change for power usage of the unclassified business, wherein the rate of change for power usage is based on at least an amount of time that lapses between a minimum power consumption level and an elevated consumption level that exceeds the minimum power consumption level by a second defined threshold;
comparing the rate of change power characteristic of the first operating hours category to the rate of change for power usage of the unclassified business to generate a similarity score describing a degree to which the rate of change for power usage of the unclassified business matches the rate of change power characteristic of the first operating hours category;
associating the unclassified business with the first operating hours category when the similarity score exceeds a defined threshold, wherein a first subset of the set of electronic messages are maintained in the storage device in association with the first operating hours category; and
controlling transmission of the set of electronic messages stored in a storage device, comprising:
i) selecting the first subset of the set of electronic messages from the storage device for transmission to remote devices associated with the unclassified business based on the unclassified business being associated with the first operating hours category; and
ii) sending the first subset of the set of electronic messages to the remote devices associated with the unclassified business.

2. The computer-implemented method of claim 1, wherein associating the unclassified business with the first operating hours category comprises associating the unclassified business with the first operating hours category by pairing metadata for the first operating hours category with information identifying the unclassified business.

3. The computer-implemented method of claim 1, further comprising:
receiving new business information for the unclassified business; and
updating an association between the unclassified business and the first operating hours category based upon the new business information.

4. The computer-implemented method of claim 1, wherein the rate of change for power usage is based on a difference between the minimum power consumption level and the elevated consumption level.

5. The computer-implemented method of claim 1, wherein the rate of change for power usage is derived from power load curve data.

6. The computer-implemented method of claim 1, wherein the minimum power consumption level for the unclassified business is determined based on an average power consumption when the unclassified business is closed.

7. A classification system comprising:
one or more processors, and
a computer-readable medium comprising instructions stored therein, which when executed by the one or more processors, causes the one or more processors to perform operations comprising:
receiving a plurality of operating hours categories, wherein a first operating hours category is associated with a first power usage profile describing a rate of change power characteristic, wherein a set of electronic messages are maintained in a storage device in association with the plurality of operating hours categories;
receiving business information for an unclassified business, wherein the business information comprises resource consumption data for the unclassified business, the resource consumption data describing a rate of change for power usage of the unclassified business, wherein the rate of change for power usage is based on at least an amount of time that lapses between a minimum power consumption level and an elevated consumption level that exceeds the minimum power consumption level by a second defined threshold;
comparing the rate of change power characteristic of the first operating hours category to the rate of change for power usage of the unclassified business to generate a similarity score describing a degree to which the rate of change for power usage of the unclassified business matches the rate of change power characteristic of the first operating hours category;
associating the unclassified business with the first operating hours category when the similarity score exceeds a defined threshold, wherein a first subset of the set of electronic messages are maintained in the storage device in association with the first operating hours category; and
controlling transmission of the set of electronic messages stored in a storage device, comprising:
i) selecting the first subset of the set of electronic messages from the storage device for transmission to remote devices associated with the unclassified business based on the unclassified business being associated with the first operating hours category; and
ii) sending the first subset of the set of electronic messages to the remote devices associated with the unclassified business.

8. The classification system of claim 7, wherein the rate of change for power usage is based on a difference between the minimum power consumption level and the elevated consumption level.

9. The classification system of claim 7, wherein associating the unclassified business with the first operating hours category comprises associating the unclassified business with the first operating hours category by pairing metadata for the first operating hours category with information identifying the unclassified business.

10. The classification system of claim 7, wherein the minimum power consumption level for the unclassified business is determined based on an average power consumption when the unclassified business is closed.

11. The classification system of claim 7, wherein the rate of change for power usage is derived from power load curve data.

12. The classification system of claim 7, wherein the elevated consumption level is set as a function of the minimum power consumption level.

13. A non-transitory computer-readable storage medium comprising instructions stored therein, which when executed by one or more processors, cause the one or more processors to perform operations comprising:
receiving a plurality of operating hours categories, wherein a first operating hours category is associated with a first power usage profile describing a rate of change power characteristic, wherein a set of electronic messages are maintained in a storage device in association with the plurality of operating hours categories;
receiving business information for an unclassified business, wherein the business information comprises resource consumption data for the unclassified business, the resource consumption data describing a rate of change for power usage of the unclassified business, wherein the rate of change for power usage is based on at least an amount of time that lapses between a minimum power consumption level and an elevated consumption level that exceeds the minimum power consumption level by a second defined threshold;
comparing the rate of change power characteristic of the first operating hours category to the rate of change for power usage of the unclassified business to generate a similarity score describing a degree to which the rate of change for power usage of the unclassified business matches the rate of change power characteristic of the first operating hours category;
associating the unclassified business with the first operating hours category when the similarity score exceeds a defined threshold, wherein a first subset of the set of electronic messages are maintained in the storage device in association with the first operating hours category; and
controlling transmission of the set of electronic messages stored in a storage device, comprising:
i) selecting the first subset of the set of electronic messages from the storage device for transmission to remote devices associated with the unclassified business based on the unclassified business being associated with the first operating hours category; and
ii) sending the first subset of the set of electronic messages to the remote devices associated with the unclassified business.

14. The non-transitory computer-readable storage medium of claim 13, wherein the rate of change for power usage is based on a difference between the minimum power consumption level and the elevated consumption level.

15. The non-transitory computer-readable storage medium of claim 13, wherein the elevated consumption level is set as a function of the minimum power consumption level.

16. The non-transitory computer-readable storage medium of claim 13, wherein associating the unclassified business with the first operating hours category comprises associating the unclassified business with the first operating hours category by pairing metadata for the first operating hours category with information identifying the unclassified business.

17. The non-transitory computer-readable storage medium of claim 13, wherein the first operating hours category is associated with a plurality of power usage profiles, the first power usage profile describing a rate of change power characteristic for a first day of a week and a power usage profile describing a rate of change power characteristic for a second day of the week.

\* \* \* \* \*